May 28, 1968 L. H. MORIN 3,385,338
LOCK NUT STRUCTURE AND METHOD OF MAKING THE SAME
Filed July 12, 1966
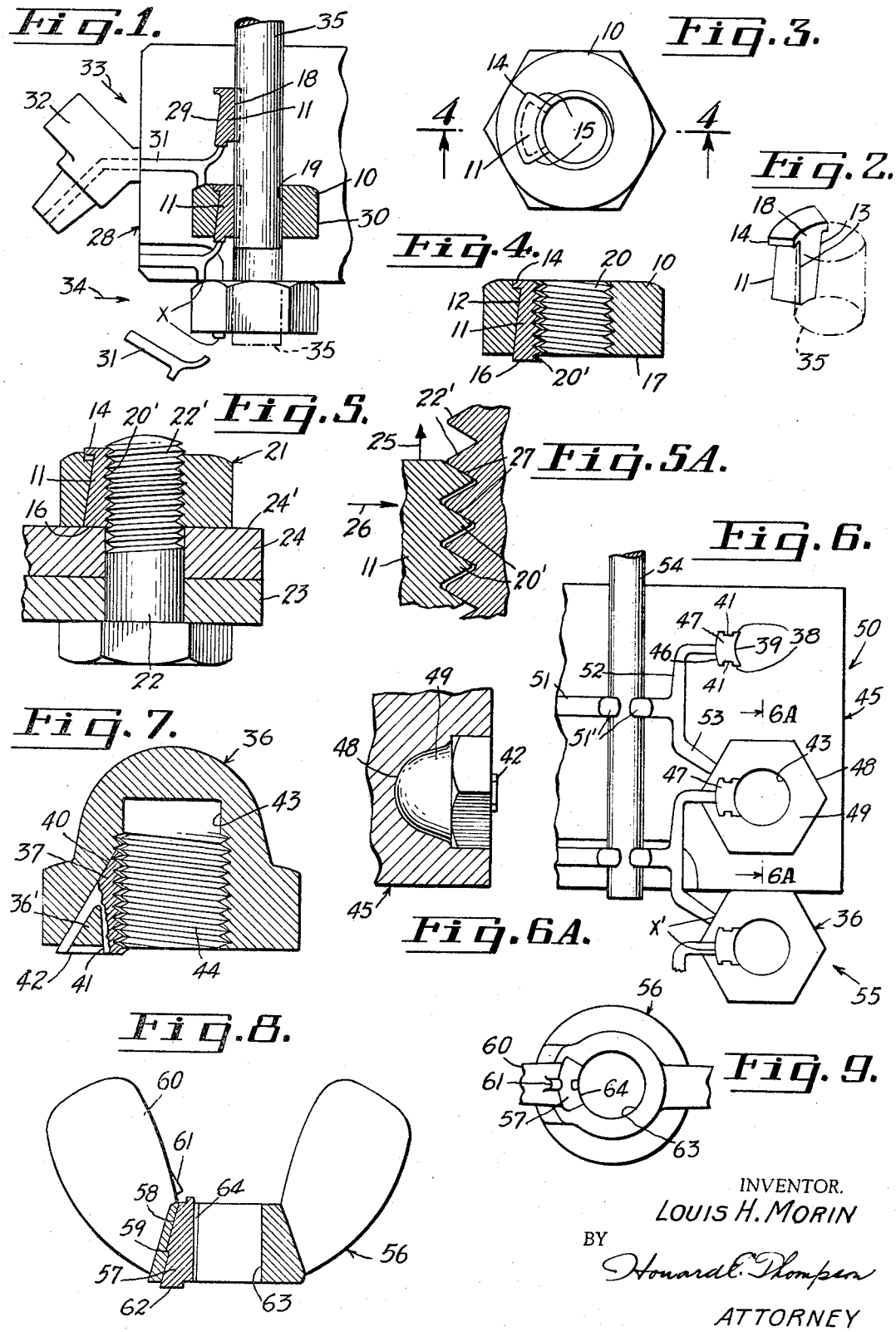
INVENTOR.
LOUIS H. MORIN
BY
Howard E. Thompson
ATTORNEY United States Patent Office 3,385,338
Patented May 28, 1968

3,385,338
LOCK NUT STRUCTURE AND METHOD
OF MAKING THE SAME
Louis H. Morin, Bronx, N.Y., assignor to Coats & Clark
Inc., New York, N.Y., a corporation of Delaware
Filed July 12, 1966, Ser. No. 564,652
1 Claim. (Cl. 151—19)

ABSTRACT OF THE DISCLOSURE

Lock nut with locking wedge moving parallel to the axis of said nut in a recess adjacent the threads.

This invention relates to the die casting of a lock nut assemblage, wherein the nut body includes a non-removable self-contained wedge member and, wherein, the assemblage is free to be spun onto the bolt or other threaded member without any resistance factor. More particularly, the invention deals with a lock nut assemblage, wherein the wedge member is so formed that, in the final tightening of the nut body, the wedge member is forced into intimate frictional contact with the threads of the bolt or other threaded member in securely locking the nut body in its tightened position.

Still more particularly, the invention deals with a method of producing a lock nut assemblage of the character defined.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic view showing the face of one die and illustrating the simultaneous casting of the nut body and wedge member in forming the cast nut lock assemblage.

FIG. 2 is a diagrammatic perspective view of the cast wedge member, indicating, in dot-dash lines, the core pin employed.

FIG. 3 is a plan view of the nut lock assemblage.

FIG. 4 is a section on the line 4—4 of FIG. 3.

FIG. 5 is a sectional view showing a use of the nut lock assemblage, shown in FIG. 4, in locked position on a bolt shown in elevation.

FIG. 5A is an enlarged diagrammatic sectional view illustrating engagement of the teeth of the wedge with the teeth of the bolt.

FIG. 6 is a diagrammatic view, generally similar to FIG. 1, illustrating the formation of another type of lock nut assemblage.

FIG. 6A is a partial section on the line 6A—6A of FIG. 6.

FIG. 7 is an enlarged sectional view through the lock nut assemblage as shown in FIG. 6 and FIG. 6A, with part of the wedge shown in elevation.

FIG. 8 is an enlarged sectional view showing a modified form of lock nut assemblage; and FIG. 9 is a plan view of part of the structure as seen in FIG. 8.

Considering FIGS. 3 and 4 of the drawing, 10 represents a nut body, in which is cast a lock wedge member 11. The member 11 has a tapered rear surface 12 and downwardly tapered sides 13, note FIG. 2. The wedge member also includes a flanged head 14. The flanged head and sides of the wedge 11 are contracted toward the axis of the body 10, as seen at 15 in FIG. 3 of the drawing. Considering FIG. 4 of the drawing, it will appear that the wedge member has a heel 16, which projects below the lower surface 17 of the nut body 10 in the cast assemblage of 10 and 11, as seen in FIG. 4 of the drawing.

In casting the assemblage, a semi-circular face 18 is formed on the wedge member 11 and, at the same time, the face of the bore 19 of the nut body 10 is formed, as will appear from a consideration of FIG. 1 of the drawing. After forming the cast lock nut assemblage, the same is threaded, as at 20 in FIG. 4 of the drawing, the threads being formed on the surfaces 18 and 19, as will be apparent. This operation is performed in manners known in the art. In this operation, the wedge member 11 will be retained in the position as shown in FIG. 4, with all of the threads 20 of the nut body 10 in alignment with the threads 20′ of the wedge member 11. It is this arrangement which facilitates free spinning of the lock nut assemblage on the threads of a bolt or the like, preparatory to the final tightening and locking of the nut assemblage.

Considering FIGS. 5 and 5A, here the reference character 21 will designate the end product lock nut assemblage mounted on a bolt 22 in the operation of securing two parts 23, 24 of any type or kind together. In the initial operation, the assemblage 21 spins freely down over the threads 22′ of the bolt, until the heel 16 of the wedge member 11 strikes the upper surface 24′ of the part 24. As the nut is tightened, the wedge member 11 moves upwardly, in the direction of the arrows 25, FIG. 5A, and inwardly, in the direction of the arrow 26 in said figure. This operation brings the upper surface of the threads 20′ of the wedge member 11 into pressure engagement with the threads 22′ of the bolt 22, as diagrammatically seen at 27 in FIG. 5A, in securely locking the nut of the assemblage 21 against opening movement.

Turning now to the diagrammatic showing of FIG. 1, 28 represents one die of a pair of dies having a lock wedge cavity 29 and a nut body cavity 30. At 31 is seen a gate or sprue leading to both cavities and 32 illustrates an injection nozzle for injecting casting material from a suitable machine into the sprue 31 and cavities 29 and 30 in simultaneously forming the two castings 10 and 11.

For purposes of description, the reference numeral 33 will generally designate the casting station and the numeral 34 will designate the trimming and stripper station. In the showing, at 35 is illustrated the transfer core forming the surfaces 18 and 19 on the respective cast parts 10 and 11. The pin 35 is utilized in movement of the cast wedge member 11 from the upper position shown in FIG. 1 to a position in the cavity 30, in each cycle of operation of the machine. Then, as the assemblage is formed, the core 35 moves downwardly to bring the assemblage to the position shown at the trimming and stripper station or where the gate or sprue 31 has been removed by trimming. Then the dies are closed for the stripping operation and the core 35 is moved upwardly from the dot-dash position of FIG. 1 to the full line position and the next successive casting operation is performed, which will produce another wedge member 11 and a nut body 10 on the previously formed wedge member, which is now positioned in the cavity 30.

Turning now to the showing in FIG. 7 of the drawing, here is illustrated another form of lock nut assemblage applied to what is generally referred to as a cap nut 36, but which can be applied to any other type and kind of threaded member incorporating what is generally referred to as a blind hole, instead of a hole which passes completely through the nut body, as illustrated in the other figures. With this type of assemblage, a substantially triangular wedge member 37 is employed, this member having parallel sides, as noted at 38 in FIG. 6. The member 37 has an inner semi-circular face 39, similar to the surface 18, a bevelled surface 40, sides of the member 37 having triangular recesses 41 and at 42 is illustrated the projecting heel on the member 37, these structures being best shown in FIG. 7. In the casting of the assemblage 36, portions of the nut body are formed in the side recesses 41, as illustrated at 36' in FIG. 7 of the drawing. These triangular portions 36' definitely retain the wedge member 37 against displacement from the nut body, as will be apparent.

After forming the assemblage 36, as later described, the bore 43 of the nut body and the surface 39 of the wedge member 37 are threaded, as seen at 44 in FIG. 7 of the drawing in the same manner as formation of the threads 20, 20' of FIG. 4 of the drawing.

In FIGS. 6, 6A, I have diagrammatically illustrated the formation of lock nut assemblages, similar to the assemblage 36, FIG. 7, and in said figures, 45 illustrates one of the dies having a cavity 46 for forming the wedge blank 47 and a cavity 48 for forming the nut blank 49 of the lock nut assemblage 36.

In FIG. 6, the reference character 50 generally identifies the casting station and at 51 is shown the sprue or gate having extensions 52 and 53 to the two cavities 46 and 48, respectively, part of the gate 51 being formed around a transfer core pin 54, as seen at 51', to enable the pin 54 to move the cast blank 47 to the lowered station within the cavity 48, as well as in shifting the formed assemblage 36 to a triming station, designated by the reference character 55. At this latter station, the gate 51 is trimmed from the assemblage and stripped from the pin 54 in the upward movement of the pin, in manners known in the art.

Considering FIG. 6A of the drawing, it will be apparent that the heel portion 42 of the member 37 is formed in the companion die part and, further, this companion die part would include cores for forming the bore 43 in the nut body, as well as the surface 39 on the wedge member 37.

The lock nut assemblage 36, as shown in FIG. 7 of the drawing, will operate in the same manner as the assemblage 21 shown in FIG. 5 in locking the assemblage upon any threaded member, the wedge member 37 moving upwardly and inwardly, as the heel 42 engages a surface of a part to be held in position, similar to the surface 24' of FIG. 5 of the drawing.

In FIGS. 8 and 9 of the drawing, I have illustrated another type of lock nut assemblage, which will be formed in manners similar to the diagrammatic showing in FIG. 1 of the drawing, and which incorporates a feature which can be advantageous in some types of lock nut assemblages. In these figures, 56 illustrates a wing nut assemblage, in which is formed a wedge member 57 which differs from the wedge member 11 in having an outwardly offset portion 58 forming a stop shoulder 59 for retaining the member 57 against downward displacement. In order to check the member 57 against upward displacement, one of the wings 60 of the nut, in alignment with the wedge member, includes an inward stop 61 which limits upward movement of the wedge member 57 while, at the same time, facilitating the upward and inward movement of the wedge member 57 when the projecting heel 62 is engaged, similar to the engagement of the heel 16 with 24' in FIG. 5 of the drawing.

The body portion of the wedge member 57 will be otherwise shaped, similar to the member 11 of FIGS. 1 to 4, inclusive. To simplify the showing, the threading of the bore 63 of the wing nut and the inner semi-circular surface 64 of the wedge member 57 has been omitted. In other words, the wing nut, as shown in FIG. 8, would represent the resulting cast product prior to formation of the threads, for example, as at 20, 20' in FIG. 4 of the drawing.

The diagrammatic illustrations in FIGS. 1 and 6 of the drawings are made to simplify the overall illustration. In other words, it will be understood that the casting of the wedge member 11 in cavity 29, as well as the casting of the wedge, identified by the numeral 47 in cavity 46 and nut bodies or blanks formed in cavities 30 and 48, respectively, actually takes place after the trimming and stripping operations and the core pins 35 and 54 have been moved to their raised position; at that time, the finished end products would not be associated with the dies, as shown, but rather these end products would have dropped into a suitable receptacle. In the trimming operations in FIG. 1, trimmings will take place at X and in FIG. 6 at X' when the dies are in open position. Then the dies are closed, preparatory to the stripping operation. To further clarify, FIGS. 1 and 6 should be considered as though the trimmed and stripped casting has been removed. The remainder of the showing in these figures would then be as it appears, in other words, with the cast assemblage at the cavity 30, FIG. 1, and the cast assemblage at the cavity 48, FIG. 6, and the cast lock wedge 11 will be in the cavity 29 and 47 will be in the cavity 46. Thus, when the castings are moved downwardly to bring the assemblages to the trimming and stripper station, the upper wedges in cavity 29 of FIG. 1 and 46 of FIG. 6 will be then positioned in the respective lower cavities 30, 48. The pin 35 is then raised to the full line position of FIG. 1 and the pin 54 will be moved to a raised position, similar to the full line position of FIG. 6. In FIG. 6, the core is shown in its lowered position in full lines for the delivery of the cast assemblage to the trimming station.

It will be apparent that the illustrations in the accompanying drawing are only by way of showing a few of the many adaptations of the principle of forming lock nut assemblages wherein the threaded portion of the member in question includes a threaded wedge performing the locking feature of the assemblage.

For purposes of description, the end products, as at 21, 36 and 56, can be generally referred to as nut-like bodies having threaded bores and wrench or tool engaging portions, facilitating tightening thereof and the parts engaged by said bodies can be generally identified as threaded members.

Having fully described my invention, what I claim as new and desire to secure by Letters Patent is:

1. A lock nut assemblage comprising a nut-like body including a threaded bore and wrench engaging portion, said threaded bore of said body opening through one surface only of said body, a lock wedge keyed to and movable axially of the bore of said body, said wedge including an inner semi-circular surface having threads normally aligned with threads in the bore of said body, said wedge including a heel portion projecting from a lower surface of said body, said projecting heel portion facilitating movement of the threads of the wedge into pressure engagement with threads of a threaded member on which said body is arranged in locking said body on said threaded member, said wedge being substantially triangular in form and having parallel sides including substantially triangular recesses, said body having a complemental wedge recess with triangular projections from the sides thereof cooperating with said triangular recesses in said wedge and said triangular recesses having an open end facing the open end of said body and a closed end at a position remote from the open end of said body.

References Cited

UNITED STATES PATENTS

| | | | |
|---|---|---|---|
| 379,278 | 3/1888 | Keating | 151—23 |
| 786,725 | 4/1905 | Bryce | 151—19 |
| 941,804 | 11/1909 | Nagyuathy | 151—23 |
| 1,204,623 | 11/1916 | Waller | 151—23 |
| 1,405,138 | 1/1922 | Kwanstrom | 151—23 |
| 2,225,654 | 12/1940 | Olson | 85—32 |
| 1,153,458 | 9/1915 | Stafford | 85—35 |
| 2,643,696 | 6/1953 | Misch | 151—19 |
| 3,312,264 | 4/1967 | Dresdner | 151—19 |

EDWARD C. ALLEN, *Primary Examiner.*